United States Patent [19]

Ishika

[11] Patent Number: 5,559,783
[45] Date of Patent: Sep. 24, 1996

[54] AN OPTICAL HEAD HAVING A ROTATING MIRROR

[75] Inventor: Sou Ishika, Kanagawa-ken, Japan

[73] Assignee: Kabushiki Kaisha Toshiba, Kawasaki, Japan

[21] Appl. No.: 308,453

[22] Filed: Sep. 19, 1994

[30] Foreign Application Priority Data

Sep. 22, 1993 [JP] Japan .................................. 5-236883

[51] Int. Cl.$^6$ ...................................... G11B 7/00
[52] U.S. Cl. ................. 369/112; 369/44.23; 369/119; 369/116; 369/44.41
[58] Field of Search ........................ 369/119, 112, 369/44.41, 44.12, 110, 85, 44.37, 44.38, 56, 44.24, 44.23, 18

[56] References Cited

U.S. PATENT DOCUMENTS

| | | | |
|---|---|---|---|
| 4,198,657 | 4/1980 | Kanamaru | 369/44.38 |
| 4,782,474 | 11/1988 | Arai et al. | 369/119 |
| 5,105,407 | 4/1992 | Ishika | 369/44.37 |
| 5,218,524 | 6/1993 | Kasahara et al. | 369/119 |
| 5,313,447 | 5/1994 | Takeshita et al. | 369/112 |
| 5,357,102 | 10/1994 | Ishika | 369/44.24 |
| 5,365,504 | 11/1994 | Noguchi | 369/112 |
| 5,420,848 | 5/1995 | Date et al. | 369/112 |

*Primary Examiner*—Georgia Y. Epps
*Assistant Examiner*—Kim-Kwok Chu
*Attorney, Agent, or Firm*—Cushman Darby & Cushman, L.L.P.

[57] ABSTRACT

An optical head device for irradiating a light beam onto a recording medium to optically reproduce information recorded on the recording medium, the device includes a light source for generating a light beam to project onto the recording medium, a detector for detecting the light beam reflected from the recording medium, and an optical system for leading the light beam from the light source to the recording medium along a first optical axis and leading the light beam reflected from the recording medium along the first optical axis to the detector. The device further includes a half mirror arranged between the optical system and the recording medium, for reflecting a part of the light beam led to the recording medium toward the optical system to lead the part of the light beam onto the detector. The half mirror is tilted at a prescribed angle against the first optical axis to lead the part of the light beam reflected along a second optical axis differ from the first optical axis to the detector.

48 Claims, 4 Drawing Sheets

AN OPTICAL HEAD HAVING A ROTATING MIRROR

BACKGROUND OF THE INVENTION

1. Field of the Invention

The present invention relates to an optical head device that applies light beam for recording/reproducing information on/from an optical disc that is used as a recording medium.

2. Description of the Related Art

An optical disc apparatus includes at least an optical head device that has an objective lens and a photo detector. By the focusing light beam applied to the recording area of a recording medium, that is, an optical disc via this optical head device, information recorded on the optical disc are read out. In addition, information are recorded on an optical disc by the focusing light beam applied.

Recently, with the increase of information to be recorded, improvement of data recording/reading speed on/from optical discs has been desired.

In view of the above, a separate type optical head device which is composed of a semiconductor laser and a main body of the optical head device, that is, a fixed portion for driving the semiconductor laser, and a movable portion including an objective lens that is used for applying light beam to an optical disc and taking reflecting light out of the optical disc, both of the fixed and movable portions are independently arranged.

On this separate type optical head device, the movable portion that is composed of an objective lens and a mirror (or a mirror prism) is constructed in small size and light weight. Further, the fixed portion and the movable portion are optically connected by a galvano mirror of which reflecting angle is variable.

However, on this separate type optical head device comprising the fixed portion and the movable portion optically connected by the galvano mirror, there is such a problem that an offset signal is generated in a tracking signal that is returned to the fixed portion by a slight tilting of the galvano mirror, so called deflection in proportion to the deflection of the galvano mirror.

In this case, reproduction of information is not accurately carried out but becomes unstable because the center of laser beam applied to a recording medium is shifted from the center of tracks formed on the recording medium. This will become a defect in increasing the recording density.

Further, on an optical disc apparatus the quantity of laser beam that is output from a semiconductor laser is generally controlled, For this control of quantity of light, a half mirror is provided on the way of the optical path for leading the laser beam generated from the semiconductor laser to an optical disc in order to lead a part of laser beam to the outside of the optical path. The laser beam led to the outside of the optical path is applied to a photo detector. Quantity of the laser beam applied to this photo detector is measured and the measuring signal is fed back to the semiconductor laser to control the laser beam quantity emitted from the semiconductor laser to an optimum level.

However, in the method to control the quantity of laser beam emitted from the semiconductor laser as described above, a photo detector has been arranged at the outside of the optical path to receive the laser beam led to the outside of the optical path by the half mirror provided on the way of the optical path. The photo detector arranged at the outside of the optical path will result in the optical head device becoming large in size.

SUMMARY OF THE INVENTION

It is an object of the present invention to provide an optical head device that is capable of high speed accessing with less shifting of light beam from recording tracks.

Further, it is another object of the present invention to provide an optical head device that is capable of controlling intensity of light beam generating from a light source without making the head large in size.

According to the present invention there is provided an optical head device for irradiating a light beam onto a recording medium to optically reproduce information recorded on the recording medium, the device comprising means for generating a light beam to project onto the recording medium; means for detecting the light beam reflected from the recording medium; optical means for leading the light beam from the generating means to the recording medium along a first optical axis and leading the light beam reflected from the recording medium along the first optical axis to the detecting means; and means, arranged between the optical means and the recording medium, for reflecting a part of the light beam led to the recording medium toward the optical means to lead the part of the light beam onto the detecting means, the reflecting means being tilted at a prescribed angle against the first optical axis to lead the part of the light beam reflected along a second optical axis differ from the first optical axis to the detecting means.

Further, according to the present invention there is provided an optical head device for irradiating a light beam onto a recording medium to optically reproduce information recorded on the recording medium, the device comprising means for generating a light beam having a prescribed intensity to project onto the recording medium; means for detecting the light beam reflected from the recording medium; optical means for leading the light beam from the generating means to the recording medium along a first optical axis and leading the light beam reflected from the recording medium along the first optical axis to the detecting means; means, arranged between the optical means and the recording medium, for reflecting a part of the light beam led to the recording medium toward the optical means to lead the part of the light beam onto the detecting means, the reflecting means being tilted at a prescribed angle against the first optical axis to lead the part of the light beam reflected along a second optical axis differ from the first optical axis to the detecting means; and means for controlling the prescribed intensity of the light beam generated by the generating means based on an intensity of light beam led to the detecting means by the reflecting means.

DETAILED DESCRIPTION OF THE PREFERRED EMBODIMENTS

Figure 1:
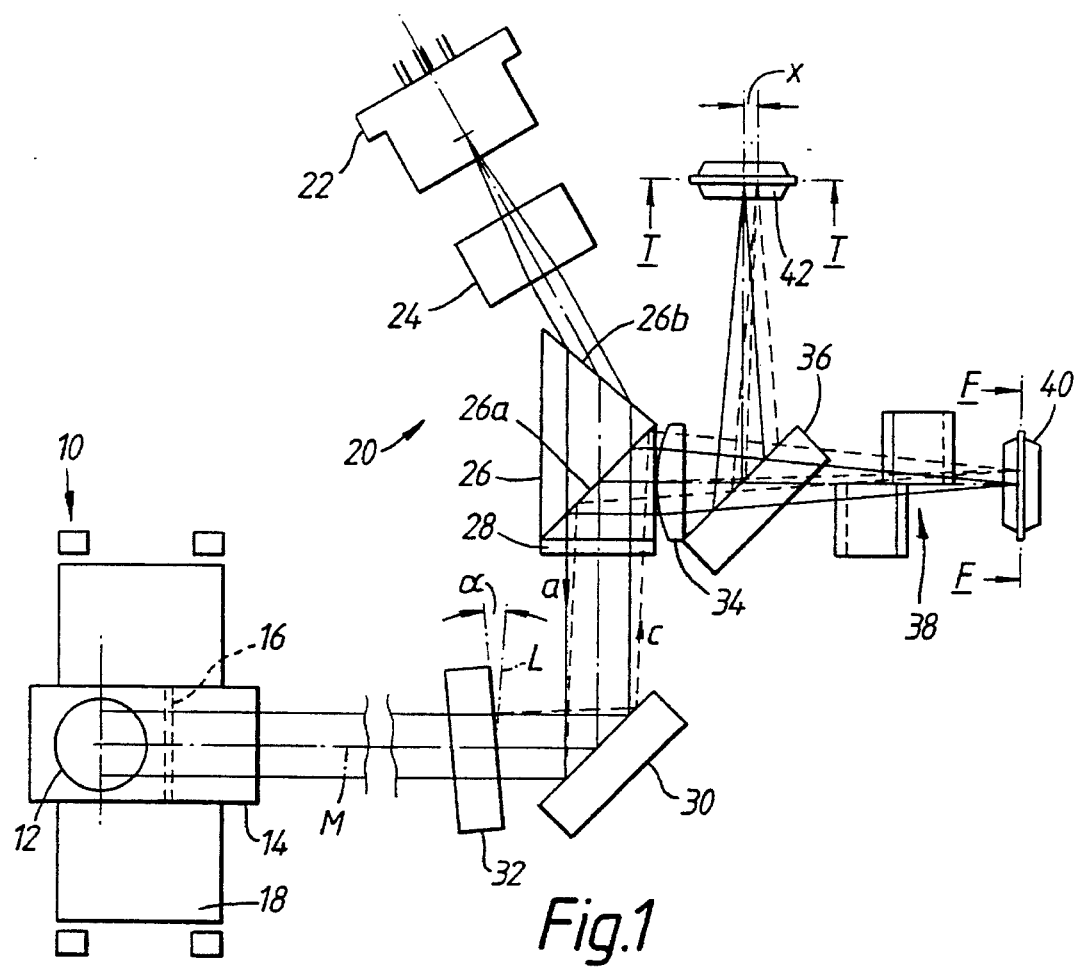
FIG. 1 is a schematic diagram showing an optical head device that is an embodiment of the present invention.

FIG. 1 shows an optical head device that is one embodiment of the present invention.

The optical head device comprises a movable optical system 10 and a fixed optical system 20. The movable optical system 10 leads the light beam reflected from a recording medium to the fixed optical system while applying the light beam to such a recording medium as an optical disc (not shown). The fixed optical system 20 supplies the light beam to the movable optical system 10 and takes out the light beam led from the movable optical system 10 by converting it into a prescribed electric signal.

The movable optical system 10 comprises an objective lens 12, a lens holder 14, an aperture 16 and a carriage 18. The lens holder 14 holds the objective lens 12 movable in the direction orthogonal to the recording surface of a recording medium, that is, in the focusing direction and further, in the direction orthogonal to tracks formed on the recording medium, that is, in the tracking direction. The carriage 18 holds the lens holder 12 movable in the direction orthogonal to the tracks on a recording medium. The aperture 16 has been incorporated in a prescribed position (generally, in the focusing position behind the objective lens 12) of the lens holder 14 in order to stabilize change in quantity of light beam projected into the objective lens 12.

The fixed optical system 20 contains a semiconductor laser beam source 22 and a polarized beam splitter 26. The semiconductor laser beam source 22 generates divergent light beam of which sectional beam shape, that is, beam spot is elliptical. The polarized beam splitter 26 has a polarized beam split surface 26a, and leads the light beam generated from the laser beam source 22 to a recording medium and also, separates the light beam reflected from this recording medium from the light beam directed toward the recording medium.

There is a collimate lens 24 arranged between the laser beam source 22 and the polarized beam splitter 26 for collimating light beam from the laser beam source 22.

A galvano mirror 30 and a half mirror 32 are arranged between the polarized beam splitter 26 and the objective lens 12 in the movable optical system 10. The light beam passed through the polarized beam splitter 26 is reflected on the galvano mirror 30 toward the objective lens 12. Part of the light beam directed toward the objective lens 12 is reflected on the half mirror 32 and returned to the galvano mirror 30. As shown in FIG. 1, the half mirror 32 is tilted at a prescribed angle α against a line L which is perpendicular to an optical axis M of the light beam directed toward the objective lens 12. A mirror driving mechanism (a tracking actuator) (not shown) has been incorporated in the galvano mirror 30 for varying an angle of the galvano mirror 30 for the purpose of tracking that is described later.

An elliptical surface 26a has been formed in one unit with the polarized beam splitter 26 for shaping the elliptical surface of light beam generated from the laser beam source 22 to a round shape. In addition, a λ/4 plate 28 is incorporated in the surface of the polarized beam splitter 26 opposing to the galvano mirror 30 for changing the phase of light beam directed toward a recording medium and the phase of light beam returning to the polarized beam splitter 26 by 90.

In the direction in which the reflecting light beam from a recording medium is separated via the polarized beam splitter 26, a convex lens 34, a half mirror 36, a first photo detector 40 and a second photo detector 42 are arranged. The convex lens 34, which has a prescribed focal distance f, focuses the light beam passed through the polarized beam splitter 26. The half mirror 36 splits the light beam focused by the convex lens 34 into two light beams. That is, the half mirror 36 splits the light beam into two parts by reflecting the half of light beam and allows the remainder to pass. The first photo detector 40 receives one of the split light beams and converts into electric signal for the focusing as described later. The second photo detector 42 receives the remainder of the split light beams and coverts into electric signal for the tracking as described later.

Between the half mirror 36 and the first photo detector 40, a beam shape conversion member 38 comprising two plane glasses is arranged. The beam shape conversion member 38 further splits the light beam passed through the half mirror 36 into two parts and shapes the light beam projecting to the first photo detector to a beam spot in a prescribed shape.

Figure 2A:
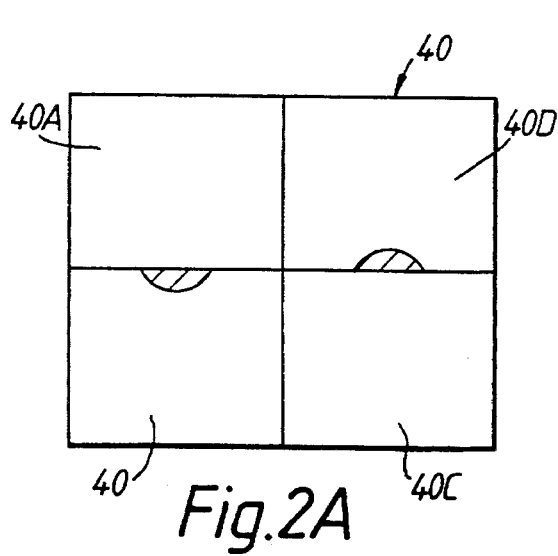
FIGS. 2A and 2B are plan views showing photo detectors that are incorporated in the optical head device shown in FIG. 1 and the laser beam that are projected.
Figure 2B:
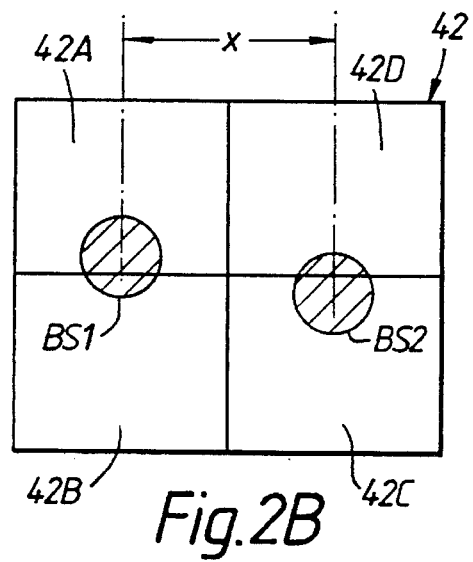
Figure 5:
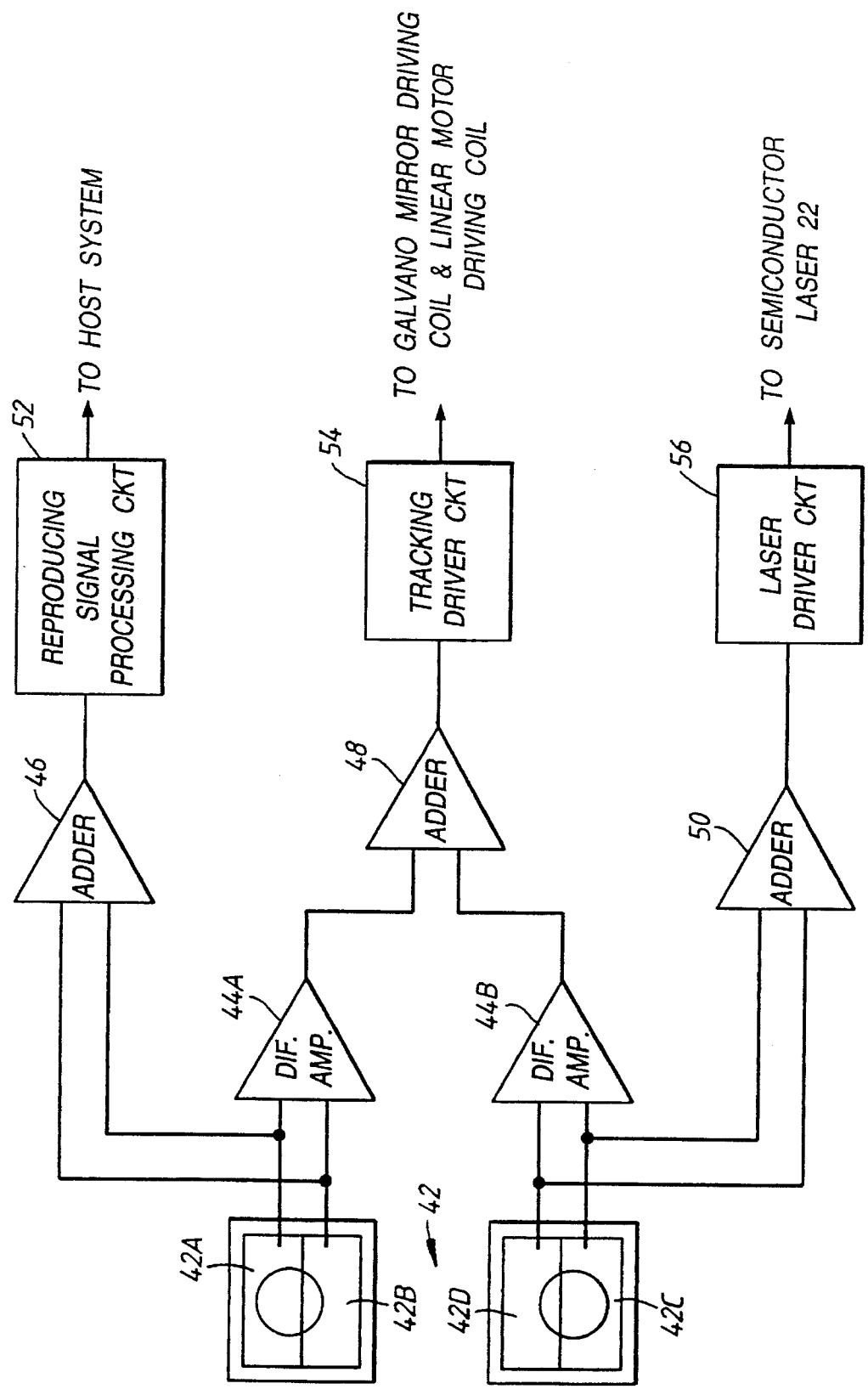
FIG. 5 is a block diagram showing one embodiment of a signal processing circuit incorporated in the optical head device shown in FIG. 1.

The first photo detector 40 has four divided detecting areas 40A, 40B, 40C and 40D as shown in FIG. 2A. Likewise, the second photo detector 42 has four divided detecting areas 42A, 42B, 42C and 42D as shown in FIG. 2B. The detecting areas 42A to 42D supply prescribed outputs to such signal processing circuits as shown in FIG. 5.

Next, the operation of the optical head device shown in FIG. 1 will now be described.

The light beam generated from the laser beam source 22 is converted into parallel beams via the collimate lens 24 and projected on the elliptical correction surface 26b of the polarized beam splitter 26. The sectional shape of light beam is corrected to the round shape when passing through this elliptical correction surface 26b. The light beam of which sectional shape has been corrected to the round shape passes through the polarized beam split surface 26a and projected to the λ/4 plate 28. The polarized surface of the light beam projected on the λ/4 plate 28 is converted into an elliptically polarized light and its light beam is projected on the galvano mirror 30.

The light beam projected on the galvano mirror 30 is reflected on the galvano mirror 30 and then, is led to the movable optical system 10 after passing through the half mirror 32.

The light beam from the galvano mirror 30 led to the movable optical system 10 is led to the lens holder 14 and projected on the objective lens 12 via a rise mirror (not shown). The light beam projected on the objective lens 12 is then projected on a prescribed track on a recording medium.

The intensity of light beam led to the prescribed track on a recording medium is changed according to existence of information (pits) recorded on the track. The light beam with the intensity changed is returned to the objective lens 12 again. The light beam returned to the objective lens 12 sequentially passes through the half mirror 32, the galvano mirror 30 and the λ/4 plate 28. After passing through the λ/4 plate 28, the light beam is returned to the polarized beam splitter 26.

The reflected light beam from a recording medium returned to the polarized beam splitter 26 is reflected on the polarized beam split surface 26a and led to the convex lens 34. The light beam led to the convex lens 34 is given with the convergence when passing through the convex lens 34. The converged light beam is led to the half mirror 36 and split into two light beams by this half mirror 36, and images are formed for the first and the second photo detectors, respectively.

As shown in FIGS. 2A and 2B, beam spots are projected on the first and the second photo detectors 40 and 42. The output signals from the first and the second photo detectors 40 and 42 with the beam spots projected are converted into tracking and focusing signals by a signal processing circuit shown in FIG. 5. At the same time, the output signal from the second photo detector 42 is used for detecting the tilt of the galvano mirror 30 and the intensity of light beam generated from the laser beam source 22.

Figure 4:
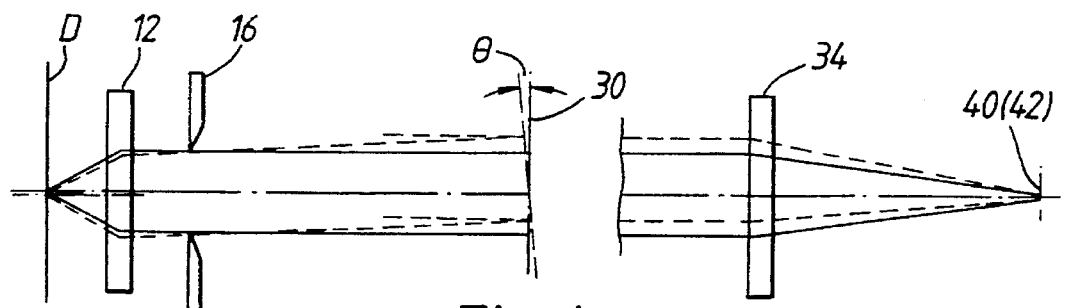
FIG. 4 is a schematic diagram showing the optical path of laser beam of a conventional optical head device without a half mirror arranged.

Next, a conventional optical head device which has no half mirror arranged between the galvano mirror and the objective lens 12 will be described with reference to FIG. 4. When assuming that the galvano mirror 30 tilts by an angle θ, the reflecting light beams from a recording medium D is shifted upward on a paper shown in FIG. 4 and is projected to the photo detectors 40 and 42 virtually in the same way as the state where the galvano mirror 30 is not tilted. That is, in FIG. 4 the advancing state of the light beam in the state where the galvano mirror is not tilted is expressed by a solid line, and the advancing state of the light beam while shifting upward on the paper by the galvano mirror 30 which is tilted by an angle θ is expressed by a dotted line. When comparing the advancing state of the light beam expressed by the solid line with that expressed by the dotted line, the state where they are only shifted in parallel with each other is shown. From this state an offset component by tilting of the galvano mirror cannot be detected. Therefore, there was such a problem that DC offset component is generated in a track detecting signal that is output from the photo detectors 40 and 42, in particular, from the photo detector 42.

The behavior of light beam of the optical head device of the present invention with the half mirror 32 arranged between the galvano mirror 30 and the objective lens 12 will be described with reference to FIGS. 3A and 3B. Optical elements constituting the optical head device are typically shown.

Figure 3A:
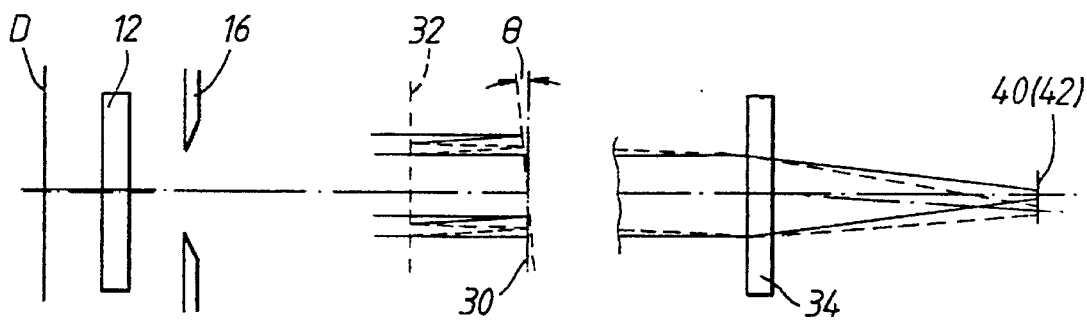
FIG. 3A is a schematic diagram showing the optical path of the laser beam of the optical head device shown in FIG. 1.
Figure 3B:
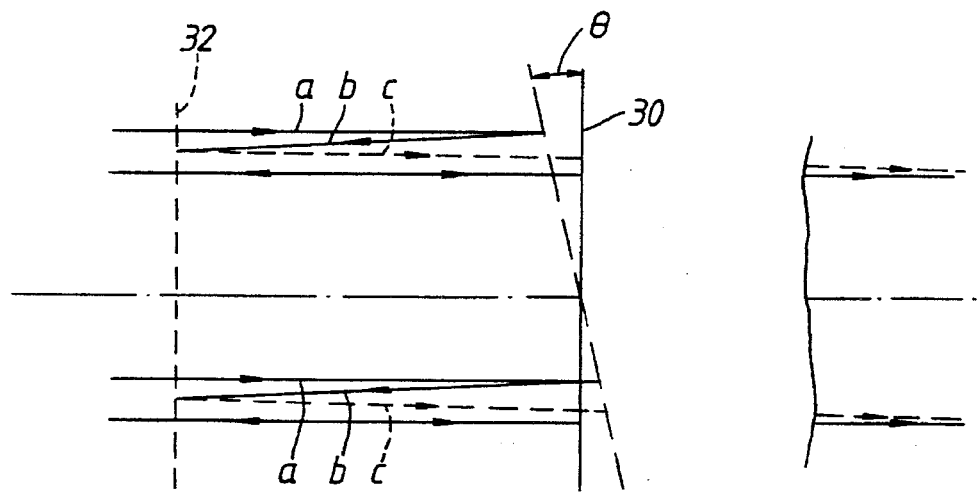
FIG. 3B is a schematic diagram showing the advancing state of light beam by a galvano mirror and a half mirror in FIG. 3A in detail.

As shown in FIGS. 3A and 3B, the light beam a generated from the laser beam source 22 and passed through the polarized beam splitter 26 is turned to the light beam b as reflected on the galvano mirror 30, and advances in the direction of the half mirror 32. A part of the light beam b passes through the half mirror 32 and is projected to the recording surface of a recording medium D via the objective lens 12 as described above. The reflected light beam from the recording medium D is finally projected to the photo detectors 40 and 42 as described above.

On the other hand, the remaining reflecting light beam c does not pass through the half mirror 32 is returned to the polarized beam splitter 26 in the state shifted upward on a paper in FIG. 3B as shown in FIG. 3B. As a result, the light beam is projected in the state where the position of the light beam to be projected to the photo detectors 40 and 42 are shifted from the original track center.

From the above, it is possible to remove an offset component by the galvano mirror 30 by detecting both of a beam spot corresponding to the reflecting light beam from a recording medium and a beam spot corresponding to the reflecting light from the half mirror 32 and obtaining a difference between respective detected outputs.

FIG. 5 shows one example of a signal processing circuit to obtain tracking signals (a linear motor driving signal and a galvano mirror driving signal) from the light beam projected to the second photo detector 42, an information reproducing signal and a monitor signal to control the output from the laser beam source 22 (a focusing signal is omitted). In FIG. 5, for the convenience of explanation, the detecting areas 42A to 42D of the photo detector 42 are shown in the state where they are divided into the areas 42A and 42B, and 42C and 42D.

The light beams applied to the photo detecting areas 42A to 42D are converted into electric signals corresponding to sizes of beam spots, respectively. These converted electric signals are supplied to a reproducing signal processing circuit 52, a tracking driving circuit 54 and a laser driving circuit 56 via adders 46, 48 and 50, respectively.

A beam spot BS1 corresponding to the reflecting light beam from a recording medium is projected to the photo detecting areas 42A and 42B, while a beam spot BS2 corresponding to the reflecting light beam reflected on the half mirror 32 (shown by the dotted line in FIG. 1) is projected to the photo detecting areas 42C and 42D.

That is, as shown in FIGS. 1 and 2B, a distance x is occured between the beam spot BS1 formed by the light beam passing through the half mirror 32 and the beam spot BS2 formed by the light beam reflected on the half mirror 32. Here, if the distance x is too long, the projected position of the beam spot BS2 may be deviated from the photo detecting areas 42C and 42D. The relation among the distance x, the tilted angle α of the half mirror 32 and the focal length f of the convex lens 34 is expressed as follows:

$$x = f \times \tan(2\alpha)$$

Therefore, the projected position of the beam spot BS2 can be set to not be deviated from the photo detecting areas 42C and 42D by adjusting of the tilted angle of the half mirror 32.

Here, deviations among the output signals of the photo detecting areas 42A, 42B, 42C and 42D are obtained by way of a differential amplifiers 44a and 44b. Thereafter, these deviations are added by an adder 48 and output to a tracking driver circuit 54. That is, a track shift signal obtained by calculating:

(Output of 42A–Output of 42B)+k(Output of 42D–Output of 42C) is supplied to the tracking driver circuit 54. Further, k is a constant that is specified according to the intensity of reflecting light beam from a recording medium and that of reflecting light beam from the half mirror 32.

According to this method, it is possible to remove an offset component of the tracking signal which is generated when the galvano mirror 30 is arranged in the state tilted from the reference position.

On the other hand, the outputs of the photo detecting areas 42A and 42B are added by the adder 46 and are processed as specified by the reproducing signal processing circuit 52. The output of this reproducing signal processing circuit 52 is supplied to a host system (not shown) and used for reproduction of information recorded on a recording medium.

Further, the outputs of the photo detecting areas 42C and 42D are supplied to the laser driver circuit 56 after added by the adder 50. The intensity of light beam output from the laser beam source 22 is kept constant by the laser driver circuit 56.

Further, although the explanation of the photo detector 40 has been omitted, a focusing signal for driving the objective lens 12 is obtained by calculating the outputs of the detecting areas 40A to 40D shown in FIG. 2 as follows:

(Output of 40A+Output of 40C)−(Output of 40B+Output of 40D)

Figure 6:
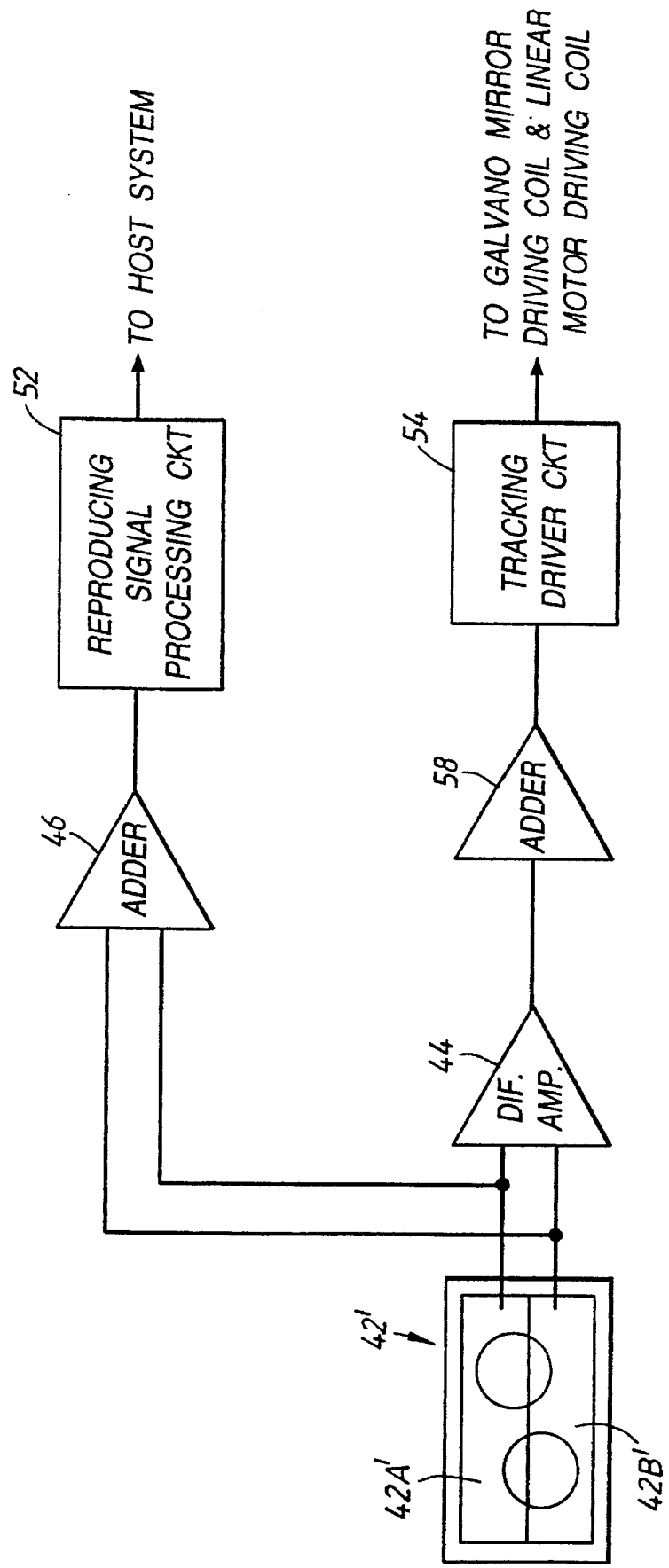
FIG. 6 is a block diagram showing another embodiment of the signal processing circuit incorporated in the optical head device shown in FIG. 1.

FIG. 6 shows another embodiment of the signal processing circuit which is incorporated in the optical head device shown in FIG. 1.

In FIG. 6, the signal processing circuit to obtain the tracking signals (the linear motor driving signal and the galvano mirror driving signal) and the information reproducing signal output from the light beam projected to the second photo detector 42' is shown (the focusing signal is omitted).

Two light beams projected to the photo detecting areas 42A' and 42B' are converted into electric signals corresponding to sizes of beam spots and supplied to the reproducing signal processing circuit 52 and the tracking driver circuit 54 via the adder 46 and the amplifier 58.

A deviation between the output signals of the photo detecting areas 42A' and 42B' is obtained by the differential amplifier 44. This deviation is amplified by the amplifier 58 and output to the tracking driver circuit 54. That is, a track shifting signal obtained by calculating:

(Output of 42A')−(Output of 42B') is supplied to the tracking driver circuit 54 likewise the example shown in FIG. 5.

As described above, according to the present invention, it is possible to easily remove an offset component contained in the track shifting signal in a separate type optical head device.

Further, it becomes possible to monitor intensity of light beam emitted from the laser beam source from the output signal of a track detecting detector and it is possible to remove a monitor circuit that has been so far used.

Accordingly, an optical disc apparatus with a high according density is provided.

What is claimed is:

1. An optical head device for irradiating a light beam onto a recording medium to optically reproduce information recorded on the recording medium, the device comprising:

means for generating a light beam having a prescribed intensity to project onto the recording medium;

means for detecting the light beam reflected from the recording medium;

optical means for leading the light beam from the generating means to the recording medium along a first optical axis and leading the light beam reflected from the recording medium along the first optical axis to the detecting means;

reflecting means arranged between the optical means and the recording medium, for reflecting a part of the light beam led to the recording medium toward the optical means which leads the part of the light beam onto the detecting means, the reflecting means being tilted at a prescribed angle against the first optical axis to lead the part of the light beam reflected along a second optical axis different from the first optical axis to the detecting means; and means for controlling the prescribed intensity of the light beam generated by the generating means based on an intensity of light beam led to the detecting means by the reflecting means.

2. The device according to claim 1, wherein the detecting means has a prescribed detecting area and the reflecting means is tilted to lead the light beam onto the prescribed detecting area.

3. The device according to claim 1, wherein the generating means includes a semiconductor laser beam source.

4. The device according to claim 1, wherein the detecting means has four divided detecting areas.

5. The device according to claim 1, wherein the optical means includes a polarized beam splitter.

6. The device according to claim 5, wherein the optical means includes a λ/4 plate incorporated with the polarized beam splitter for changing the phase of the light beam directed toward the recording medium and the phase of the light beam returning to the polarized beam splitter by 90°.

7. The device according to claim 5, wherein the optical means includes a galvano mirror capable of varying a reflecting angle for controlling an optical path of light beam led to the recording medium via the polarized beam splitter and an optical path of light beam reflected on the recording medium.

8. The device according to claim 5, wherein the optical means includes a convex lens, which has a prescribed focal distance, arranged between the polarized beam splitter and the detecting means for focusing the light beam through the polarized beam splitter.

9. An optical head device for irradiating a light beam onto a recording medium to optically reproduce information recorded on the recording medium, the device comprising:

means for generating a light beam to project onto the recording medium;

means for detecting the light beam reflected from the recording medium;

optical means for leading the light beam from the generating means to the recording medium along a first optical axis and leading the light beam reflected from the recording medium along the first optical axis to the detecting means; and reflecting means arranged between the optical means and the recording medium, for reflecting a part of the light beam led to the recording medium toward the optical means which lead the part of the light beam onto the detecting means, the reflecting means being tilted at a prescribed angle against the first optical axis to lead the part of the light beam reflected along a second optical axis different from the first optical axis to the detecting means.

10. The device according to claim 9, wherein the detecting means has a prescribed detecting area and the reflecting means is tilted to lead the light beam onto the prescribed detecting area.

11. The device according to claim 9, wherein the generating means includes a semiconductor laser beam source.

12. The device according to claim 9, wherein the detecting means has four divided detecting areas.

13. The device according to claim 9, wherein the optical means includes a polarized beam splitter.

14. The device according to claim 13, wherein the optical means includes a λ/4 plate incorporated with the polarized beam splitter for changing the phase of the light beam directed toward the recording medium and the phase of the light beam returning to the polarized beam splitter by 90°.

15. The device according to claim 13, wherein the optical means includes a galvano mirror capable of varying a reflecting angle for controlling an optical path of light beam led to the recording medium via the polarized beam splitter and an optical path of light beam reflected on the recording medium.

16. The device according to claim 13, wherein the optical means includes a convex lens, which has a prescribed focal distance, arranged between the polarized beam splitter and the detecting means for focusing the light beam through the polarized beam splitter.

17. An optical head device comprising:

a light source;

separating means for leading light beam from the light source to a recording medium and for separating light beam reflected by the recording medium from the light beam directed toward the recording medium;

first reflecting means capable of varying a reflecting angle for controlling an optical path of light beam led to the recording medium via the separating means and an optical path of light beam reflected by the recording medium;

second reflecting means arranged at a prescribed angle between the first reflecting means and the recording medium for returning a portion of the light beam reflected by the first reflecting means toward the recording medium to the separating means;

detecting means for detecting deflection of the reflecting angle of the first reflecting means by the light reflected by the second reflecting means and separated by the separating means; and control means for varying the reflecting angle of the first reflecting means detected by the detecting means.

18. The device according to claim 17, wherein the light source includes a semiconductor laser beam source.

19. The device according to claim 17, wherein the detecting means has four divided detecting areas.

20. The device according to claim 17, wherein the separating means includes a polarized beam splitter.

21. The device according to claim 20 further comprising a λ/4 plate incorporated with the polarized beam splitter for changing the phase of the light beam directed toward the recording medium and the phase of the light beam returning to the polarized beam splitter by 90°.

22. The device according to claim 21 further comprising a convex lens, which has a prescribed focal distance, arranged between the polarized beam splitter and the detecting means for focusing the light beam through the polarized beam splitter.

23. The device according to claim 17, wherein the first reflecting means includes a galvano mirror.

24. An optical head device comprising:

a light source;

separating means for leading light beam from the light source to a recording medium and for separating light beam reflected by the recording medium from the light beam directed toward the recording medium from the light source;

reflecting means arranged between the separating means and the recording medium at a prescribed angle for returning a part of the light beam directed toward the recording medium to the separating means;

light beam intensity detecting means for detecting the light beam reflected by the reflecting means and separated by the separating means, and detecting the intensity of the light beam generated from the light source; and control means for varying the output of the light source based on the intensity of light beam detected by the light beam intensity detecting means.

25. The device according to claim 24, wherein the light source includes a semiconductor laser beam source.

26. The device according to claim 24, wherein the light beam intensity detecting means has four divided detecting areas.

27. The device according to claim 24, wherein the separating means includes a polarized beam splitter.

28. The device according to claim 27 further comprising a λ/4 plate incorporated with the polarized beam splitter for changing the phase of the light beam directed toward the recording medium and the phase of the light beam returning to the polarized beam splitter by 90°.

29. The device according to claim 28 further comprising a convex lens, which has a prescribed focal distance, arranged between the polarized beam splitter and the detecting means for focusing the light beam through the polarized beam splitter.

30. The device according to claim 24, wherein the reflecting means includes a galvano mirror.

31. An optical head device comprising:

a light source;

separating means for leading light beam from the light source to a recording medium having a guide groove and separating light beam reflected by the recording medium from the light beam directed toward the recording medium from the light source;

first reflecting means capable of varying a reflecting angle for controlling an optical path of light beam led to the recording medium via the separating means and an optical path of light beam reflected by the recording medium;

second reflecting means arranged between the first reflecting means and the recording medium at a prescribed angle for returning a part of the light beams reflected by the first reflecting means and directed toward the recording medium to the separating means;

lens means arranged between the second reflecting means and the recording medium for focusing the light beam from the light source on a prescribed position on a recording surface of the recording medium;

detecting means for detecting the light beam led by the separating means and detecting a gap between the light beam passing along the optical axis of the lens means and the guide groove; and control means for controlling the reflecting angle of the first reflecting means by detecting a displacement of the reflecting angle of the first reflecting means based on the output corresponding to the reflected light beam from the second reflecting means detected by the detecting means, and for detecting the intensity of the light from the light source beam generated from the light source and varying the output of the light source based on the detected intensity of light beam.

32. The device according to claim 31, wherein the light source includes a semiconductor laser beam source.

33. The device according to claim 31, wherein the detecting means has four divided detecting areas.

34. The device according to claim 31, wherein the separating means includes a polarized beam splitter.

35. The device according to claim 34 further comprising a λ/4 plate incorporated with the polarized beam splitter for changing the phase of the light beam directed toward the recording medium and the phase of the light beam returning to the polarized beam splitter by 90°.

36. The device according to claim 35 further comprising a convex lens, which has a prescribed focal distance, arranged between the polarized beam splitter and the detecting means for focusing the light beam through the polarized beam splitter.

37. The device according to claim 31, wherein the second reflecting means includes a half mirror.

38. The device according to claim 31, wherein the first reflecting means includes a galvano mirror.

39. An optical head device comprising:

a light source;

first separating means for leading light beam from the light source to a recording medium having a guide groove and for separating light beam reflected on the recording medium from the light beam directed toward the recording medium from the light source;

first reflecting means capable of varying a reflecting angle for controlling an optical path of light beam led to the recording medium via the separating means and an optical path of light beam reflected by the recording medium;

second reflecting means arranged between the first reflecting means and the recording medium at a prescribed angle for returning a part of the light beam reflected by the first reflecting means and directed toward the recording medium to the separating means;

lens means arranged between the second reflecting means and the recording means for focusing the light beam from the light source on a prescribed position on a recording surface of the recording medium;

second separating means for further separating the light beam separated from the light beam directed toward the recording medium by the first separating means;

first detecting means for detecting a gap of distance between the lens means and the recording medium by detecting one of the light beams separated via the second separating means;

second detecting means for detecting a gap between the light beam passing along the optical axis of the lens means and the guide groove by detecting the other of the light beams separated by the second separating means; and control means for controlling a reflecting angle of the first reflecting means by detecting a displacement of the reflecting angle of the first reflecting means based on at least one of the outputs corresponding to the reflecting light beams from the second reflecting means detected by the first and the second detecting means, and for detecting the intensity of light beam generated from the light source and varying the output of the light source based on the detected intensity of light beam.

40. The device according to claim 39, wherein the light source includes a semiconductor laser beam source.

41. The device according to claim 39, wherein the first detecting means has four divided detecting areas.

42. The device according to claim 39, wherein the second detecting means has four divided detecting areas.

43. The device according to claim 39, wherein the first separating means includes a polarized beam splitter.

44. The device according to claim 43 further comprising a λ/4 plate incorporated with the polarized beam splitter for changing the phase of the light beam directed toward the recording medium and the phase of the light beam returning to the polarized beam splitter by 90°.

45. The device according to claim 44 further comprising a convex lens, which has a prescribed focal distance, arranged between the polarized beam splitter and the detecting means for focusing the light beam through the polarized beam splitter.

46. The device according to claim 39, wherein the first reflecting means includes a galvano mirror.

47. The device according to claim 39, wherein the second reflecting means includes a half mirror.

48. The device according to claim 39, wherein the second separating means includes a half mirror.

* * * * *